(No Model.)

C. H. DYE.
COTTON PICKER'S SACK.

No. 316,344.  Patented Apr. 21, 1885.

Witnesses.
A. Ruppert,
H. J. England

Inventor.
Charles H. Dye
by
Lenox Simpson & Co

United States Patent Office.

CHARLES HEADEN DYE, OF ILLINOIS BEND, TEXAS.

COTTON-PICKER'S SACK.

SPECIFICATION forming part of Letters Patent No. 316,344, dated April 21, 1885.

Application filed April 23, 1884. (No model.)

*To all whom it may concern:*

Be it known that I, CHARLES H. DYE, a resident of Illinois Bend, in the county of Montague and State of Texas, have invented an Improved Cotton-Picker's Sack, of which the following is a specification.

The object of the invention is to improve that class of sacks which are used by cotton-pickers and form a receptacle for cotton after it has been culled from the bolls, and in which it is carried to the gin. These sacks as now made are packed with cotton so as to be unwieldy, difficult to manipulate, and unhandy to empty, thus necessitating a great deal of labor and much waste of time.

Figure 1:
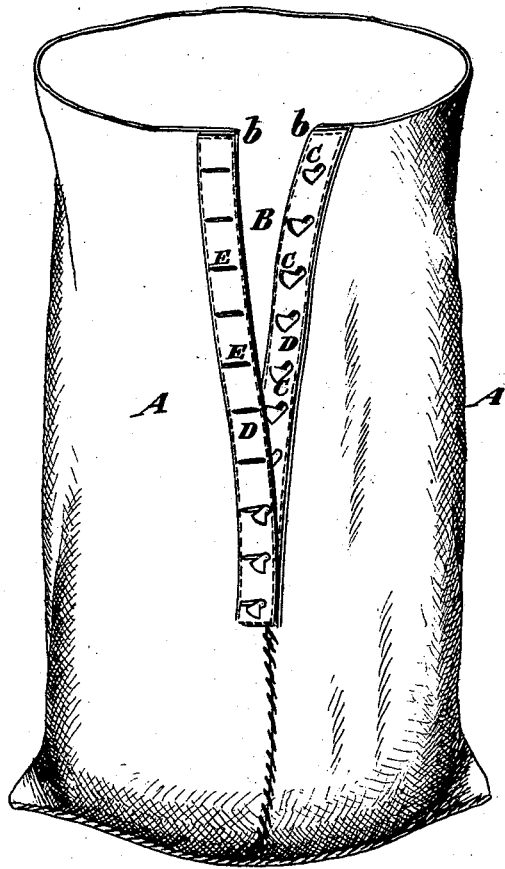
Figure 2:
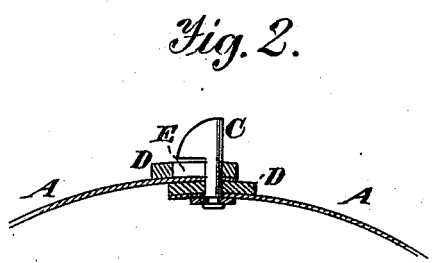

Figure 1 of the drawings is an elevation showing clearly the distinctive peculiarity of my invention. Fig. 2 is a detail view to show the form of button used on the sack.

In the drawings, A represents a cotton-picker's sack, into which he packs the cotton tightly as he picks it from the bolls in the field. This is done through the opening at the top of sack. My inlet for the cotton is also at the top; but in the ordinary sack this inlet is also the outlet for the cotton, while I make the side outlet, B. I preferably make this outlet to extend from the top for about two-thirds of the length of sack, sewing it up from the bottom for about one-third the length. The edges *b b* on the opposite sides of this opening are brought together, and secured by buttons C, which are adapted to turn about one half-revolution in either direction. On both of said edges *b* are attached a leather or re-enforcing binding, D, and to one of them are riveted the buttons C, while in the opposite edge *b* are made holes E, through which the buttons may pass, and across which they may be turned.

My cotton-sack is used by the picker as follows: As he passes along the rows of cotton-plants, he picks the cotton from their bolls and packs it as closely as possible through the inlet or top opening, as is usually done. When he has about one hundred and twenty-five to one hundred and forty pounds, he carries his sack to the gin, opens the outlet B, and quickly discharges the contents of the sack, ordinarily in about one minute. On the contrary, where the cotton is discharged through the top opening the picker must pull at it for some time, and spend several minutes in getting it loose and out of the sack.

What I claim as new, and desire to protect by Letters Patent, is—

A cotton-picker's sack having an inlet at the top, an outlet at the side, and means by which said outlet may be closed or opened, substantially as and for the purpose specified.

CHARLES HEADEN DYE.

Witnesses:
    W. W. WICKLIFFE,
    J. W. DAVENPORT.